(12) United States Patent
Shoji

(10) Patent No.: US 6,659,429 B2
(45) Date of Patent: Dec. 9, 2003

(54) SELF-LOCKING REDUCTION DEVICE

(76) Inventor: Katsuji Shoji, 1-5-28, Koshigoe, Kamakura-shi, Kanagawa-ken (JP)

( * ) Notice: Subject to any disclaimer, the term of this patent is extended or adjusted under 35 U.S.C. 154(b) by 51 days.

(21) Appl. No.: 10/020,806

(22) Filed: Dec. 12, 2001

(65) Prior Publication Data
US 2003/0109348 A1 Jun. 12, 2003

(51) Int. Cl.$^7$ .................................................. B66D 1/14
(52) U.S. Cl. ..................................... 254/342; 254/356
(58) Field of Search ................................. 254/268, 342, 254/356, 375

(56) References Cited

U.S. PATENT DOCUMENTS

| | | | | |
|---|---|---|---|---|
| 3,985,047 A | * | 10/1976 | Therkelsen | 254/354 |
| 4,426,064 A | * | 1/1984 | Healy | 254/342 |
| 4,595,173 A | * | 6/1986 | Anderson | 254/342 |
| 4,854,547 A | * | 8/1989 | Oliphant | 254/271 |
| 5,290,014 A | * | 3/1994 | Fergison, Jr. | 254/342 |
| 6,209,690 B1 | * | 4/2001 | Kuivamaki et al. | 188/187 |
| 6,520,483 B1 | * | 2/2003 | Miyoshi et al. | 254/267 |

FOREIGN PATENT DOCUMENTS

JP          2001-041293            2/2001

* cited by examiner

*Primary Examiner*—Emmanuel Marcelo
(74) *Attorney, Agent, or Firm*—McKee, Voorhees & Sease, P.L.C.

(57) ABSTRACT

A self-locking reduction device used in a winch has a support to which an input shaft is rotatably mounted. The input shaft has an eccentric shaft portion. Three pins are formed at regular intervals on a circumference around the center of the eccentric shaft portion on an external gear that is mounted to the eccentric shaft portion. Three bores are formed at regular intervals on the support facing the external gear on a circumference around the center of the input shaft. The pins are engaged with the bores so that the external gear may be eccentrically moved. The number of internal teeth of the internal gear is slightly more than that of the external teeth of the external gear, thereby providing a reliable self-locking reduction device.

12 Claims, 3 Drawing Sheets

000000# SELF-LOCKING REDUCTION DEVICE

BACKGROUND OF THE INVENTION

The present invention relates to a self-locking reduction device in which rotational force from an input shaft is surely transmitted to output means, while rotational force from the output means is prevented from being transmitted to the input shaft.

In a known spur-gear-type reduction device used in a winch, it is impossible to prevent rotational force from being transmitted to an input shaft without additional braking means.

In a worm-gear-type reduction device, by determining a lead angle less than a friction angle of a tooth surface, self-locking can be made at some extent. But, coefficient of friction can be less than expected value owing to sliding speed, vibration, running feature and lubrication to cause slacking accident and unreliable self-locking.

The inventor invented a reliable self-locking reduction device using a micro-tooth-number-difference composite hypocycloid which has two-step internal gear mechanism, and filed it as Japanese Patent Application No.11-210793 (Pub.No.2001-41293).

This reduction device was developed to have high reduction ratio of more than 40:1. But it is required to provide a reliable simplified self-locking reduction device having low reduction ratio of 8:1 to 40:1.

SUMMARY OF THE INVENTION

It is an object of the invention to provide a reliable self-locking small high-functional reduction device and a winch in which it is used.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
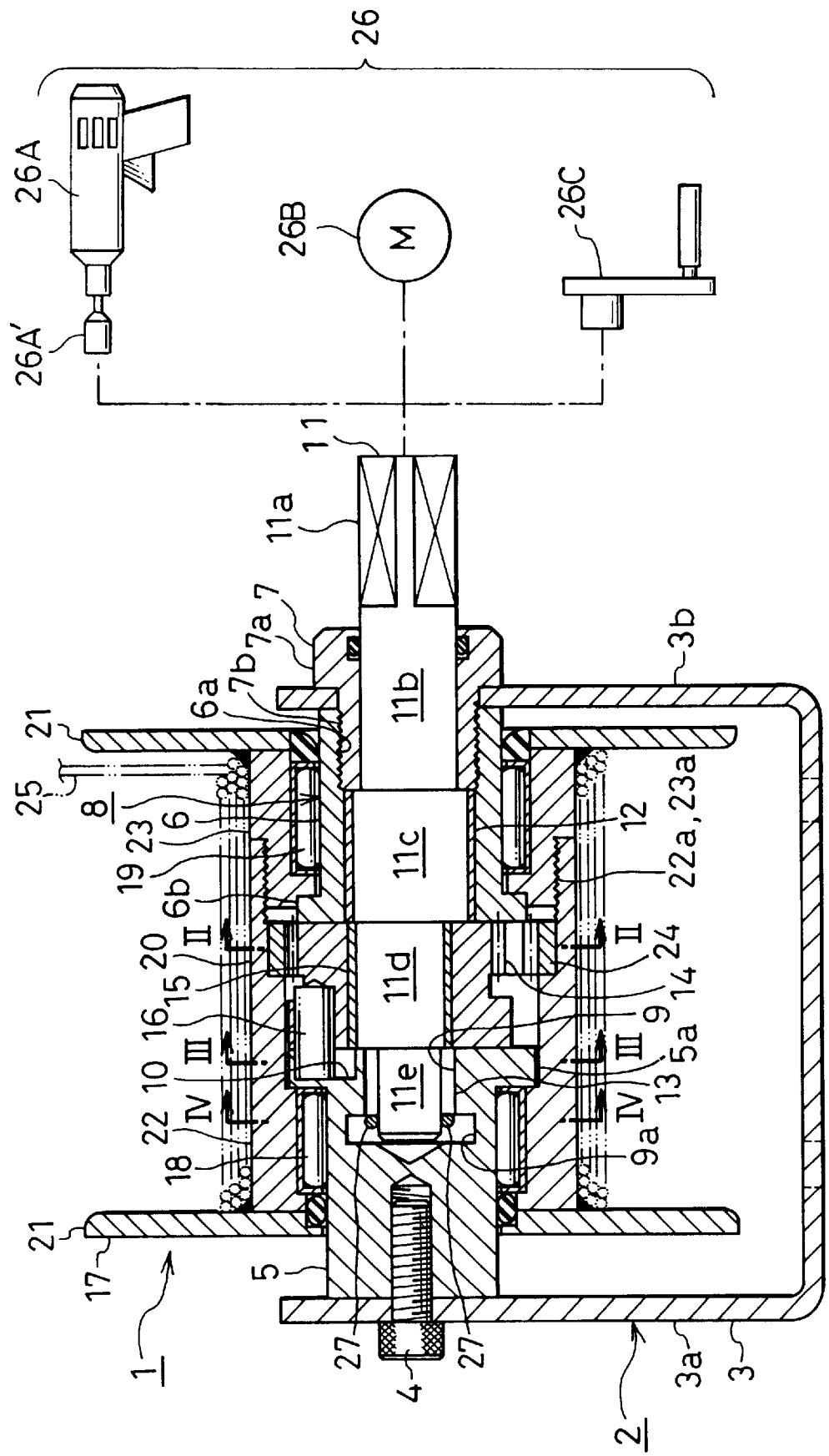
FIG. 1 is a central vertical sectional front view of a winch which has a reduction device according to the present invention.
Figure 2:
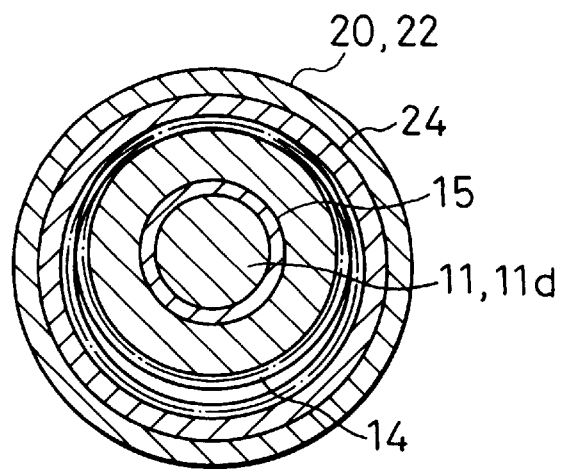
FIG. 2 is a sectional view taken along the line II—II in FIG. 1.

FIGS. 1 to 5 illustrate an embodiment of a winch which has a self-locking reduction device.

A support 2 in the winch 1 comprises a U-shaped support frame 3, a cylindrical bearing 5 fixed to the upper part of a left side 3a thereof by a screw 4, and a bearing tube 8 fixed to the upper part of a right side 3b to have a coaxial horizontal axis "O" with the bearing 5 by engagement of an external thread 7b of an outer tube 7 in an internal thread 6a of an inner tube 6 provided in the upper portion of the side 3b of the support frame 3, a head 7a of the outer tube 7 being placed outside of the side 3b.

At the right end of the bearing 5, an outward flange 5a is provided, and there is formed a bearing bore 9 having the axis "O" and an enlarged-diameter bore 9a. On the right end of the outward flange 5a, three blind bores 10 are formed on the circumference around the axis "O" at regular intervals. At the left end of the inner tube 6, an outward flange 6b is provided.

The horizontal input shaft 11 is borne by the bearing 5 and the bearing tube 8 of the support 2.

The input shaft 11 comprises a rectangular shaft portion 11a, a middle diameter shaft portion 11b, a larger-diameter shaft portion 11c, an eccentric shaft portion 11d and a smaller-diameter shaft portion 11e. The rectangular shaft portion 11a is projected from the outer tube 7. The middle-diameter shaft portion 11b is provided in the outer tube 7. The larger-diameter shaft portion 11c is provided in a metal sleeve 12 pressed in the inner tube 6. The smaller-diameter shaft portion 11e is borne by a needle roller bearing 13 in the bearing bore 9 of the bearing 5. Thus, the input shaft 11 is rotatably supported around the axis "O" by the support 2.

On the eccentric shaft portion 11d of the input shaft 11, a metal sleeve 15 pressed in an axial bore of an external gear 14 is rotatably provided. Three pins 16 engaged in three bores 10 respectively are provided at regular intervals on the circumference around an axis of the eccentric shaft portion 11d on the left end of the external gear 14 opposing the right end of the bearing 5.

Figure 5:
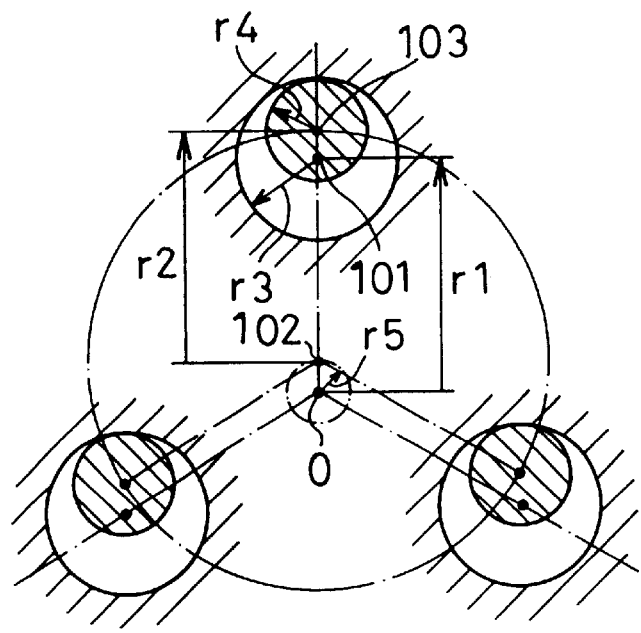
FIG. 5 is a view which shows function of the invention.

As shown in FIG. 5, the distance "r1" between the axis "O" and the center 101 of the bore 10 is nearly equal to the distance "r2" between the center 102 of the eccentric shaft portion 1d and the center of 103 of the pin 16. The difference "r3−r4" between radius "r3" of the bore 10 and radius "r4" of the pin 16 is nearly equal to the eccentricity "r5" between the axis "O" and the center of the eccentric shaft portion 11d.

Therefore, when the input shaft 11 is rotated, each of the pins 16 slid on the inner surface of the bore 10 and eccentrically moved therein. The external gear 14 is eccentrically moved with respect to the support 2 without rotating around the axis "O".

An output winding drum 17 is rotatably provided on the outer circumferences of the bearing 5 and the inner tube 6 of the bearing tube 8 via needle roller bearings 18,19. The winding drum 17 comprises a tube 20 and outward flanges 21,21 at the ends thereof. The tube 20 comprises two tubular portions 22,23 which are engaged with each other by engagement portions 22a,23a. On the inner surface of the tubular portion 22 in the middle of the tube 20, internal teeth of an internal gear 24 are engaged with external teeth of the external gear 14 coaxially with each other. The number "N2" of the internal teeth is slightly more than the number "N1" of the external teeth.

As shown by dotted lines in FIG. 1, a wire 25 is wound on the winding drum 17, and a drive means 26 is connected to the rectangular shaft portion 11a of the input shaft 11. Instead of the wire 25, a rope etc. may be wound around the winding drum 17.

For example, the drive means 26 may be an electric tool 26A, such as an electric drill, an output shaft of which is connected by an attachment 26A' which is engaged with the rectangular shaft portion 11a of the input shaft 11; an electric motor 26B joined to the input shaft 11; or a manually-operated rotary handle 26C engaged on the rectangular shaft portion 11a of the input shaft 11.

By the drive means 26, the input shaft 11 is rotated in a desired direction, and the external gear 14 is eccentrically moved around the axis "O" as mentioned above without turning with respect to the support 2. Then, the internal gear 24 engaged with the external gear 14 and the winding drum 17 connected therewith are rotated in the same direction as that of the input shaft 11 by (N2−N1)/N2 that is angular velocity corresponding to the difference between the number N2 of the internal teeth and the number N1 of the external teeth per one rotation of the input shaft 11, so that the wire 25 is wound around the winding drum 17 or unwound therefrom.

Figure 3:
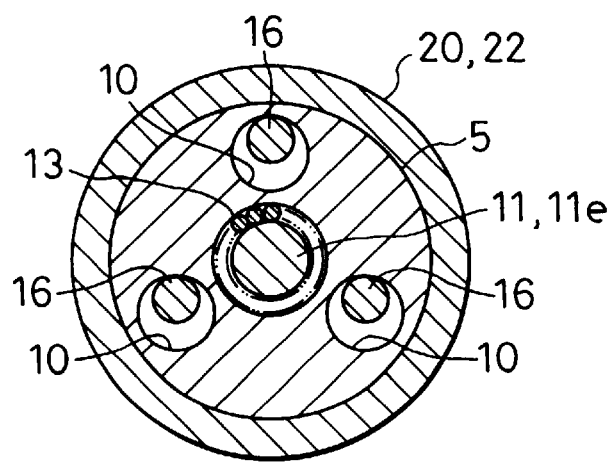
FIG. 3 is a sectional view taken along the line III—III in FIG. 1.

When external force is applied to the winding drum 17 to turn in either of rotational directions while the drive means 26 and the input shaft 11 stop, as shown in FIGS. 3 and 5, one of three combinations of the bore 10 and pin 16 is contacted to prevent rightward and leftward rotations of the external gear 14 in FIG. 3, so that rotation of the winding drum 17 is prevented so as to achieve self-locking, and rotational force from the winding drum 17 is not transmitted to the input shaft 11 and the drive means 26.

Figure 4:
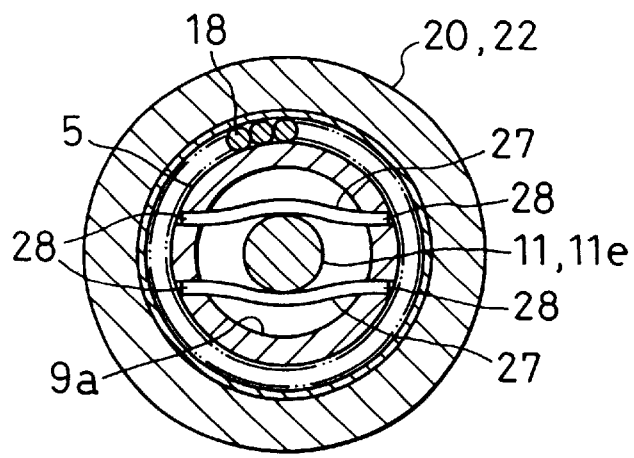
FIG. 4 is a sectional view taken along the line IV—IV in FIG. 1.

As shown in FIGS. 1 and 4, in the bearing 5, a pair of rods 27,27 or leaf springs made of spring steel grasps the smaller-diameter portion 11e of the input shaft 11 elastically in the enlarged-diameter bore 9a. The ends of the rods 27,27 are engaged in the support bore 28. The rods 27,27 elastically grasp the smaller-diameter shaft portion 11e in the elastically deformable middle portion to act as means for braking the input shaft 11.

The braking means provides self-locking in more reliable manner and suitable resistance to operation of the drive means 26 to increase operative function.

But, if rotation resistance of the input shaft 11 is high at some extent, such brake means may be omitted and known brake means may be employed instead of the brake means which comprises a pair of rods 27,27.

The bores 19 may be formed at the lower end of the external gear 14, and the pins 16 may be provided at the right end of the bearing 5.

In the foregoing embodiment, the support 2, the input shaft 11, the external gear 14, the internal gear 24 and the winding drum 17 as output means constitute a self-locking reduction device according to the present invention.

Figure 6:
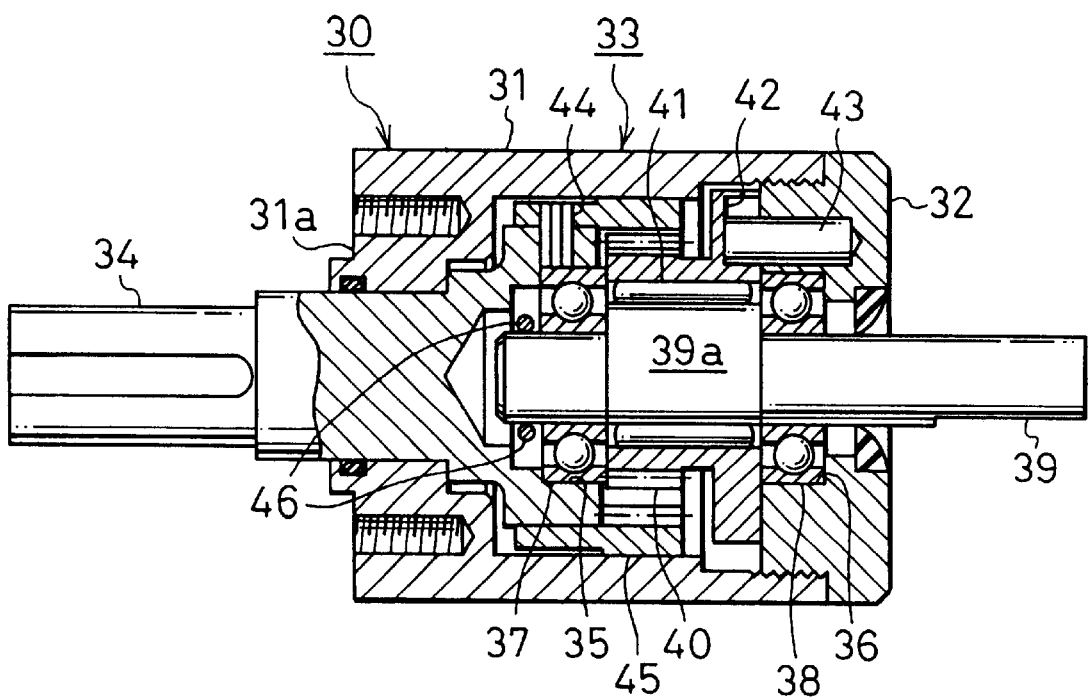
FIG. 6 is a central vertical sectional front view of another embodiment of a reduction device according to the present invention.

FIG. 6 illustrates another embodiment of a self-locking reduction device according to the present invention. The main structure of the embodiment is almost similar to that in the former embodiment, and description thereof is omitted. Only differences will be described.

In the embodiment, a cover 32 is mounted on the right end of a cylinder 1 having an end wall 31a at the left end to constitute a support 33 of a self-locking reduction device 30. An output shaft 34 is projected from the end wall 31a. An input shaft 39 is supported by ball bearings 37,38 put in bearing bores 35,36 respectively. An external gear 40 is engaged on a larger-diameter eccentric shaft portion 39a of the input shaft 39 via a needle roller bearing 41 between the ball bearings 37,38. Three bores 42 are formed at the right end of the external gear 40 and three pins 43 are provided at the left end of the cover 32 so as to have similar relationship with that of the bores 10 and the pins 16 in the former embodiment. An internal gear 45 fixed to the right end of the output shaft 34 via a spring pin 44 is engaged in the external gear 40. At the right end of the output shaft 34, there is provided a pair of rods 46,46 or leaf springs similar to the rods 27,27 in the former embodiment to grasp the left end of the input shaft 39 elastically to apply braking force to the input shaft 39.

According to similar principle and function to the former embodiment, the reduction device 30 rotates the input shaft 39 in a desired direction, thereby rotating the output gear 34 integrally connected to the internal gear 45 in the same direction at reduction ratio of (N2−N1)/N2 wherein N1 stands for the number of external teeth of the external gear 40 and N2 stands for the number of internal teeth of the internal gear 45, and preventing rotational force of the output shaft 34 from being transmitted to the input shaft 39 when the input shaft 39 stops, to achieve reliable self-locking function.

In the reduction device in FIG. 6, the input shaft 39 is projected from one end of the support 33, and the output shaft 34 is projected from the other end of the support 33 to align with the input shaft 39, so that drive and driven shafts are provided in the same line, whereby it can be assembled in all types of drive mechanisms to provide multi-usable reduction device.

The foregoing merely relates to embodiments of the invention. Various changes and modifications may be made by person skilled in the art without departing from the scope of claims wherein:

What is claimed is:

1. A self-locking reduction device which comprises:
   a support; an input shaft which is rotatably mounted to the support and has an eccentric shaft portion; an external gear which is rotatably mounted to the eccentric shaft portion;
   drive means for driving the input shaft;
   output means which is rotatably mounted to the support and coaxial with the input shaft, said output means having an internal gear which is engaged with the external gear, three pins or bores being formed at regular intervals on the external gear on a circumference around a center of said eccentric shaft portion, while three bores or pins being formed at regular intervals on the support facing the external gear on a circumference around a center of said input shaft, the former pins or bores being engaged with the latter bores or pins so that the external gear may be eccentrically moved, internal teeth of the internal gear engaged with the external teeth of the external gear being slightly more in number than the external teeth of the external gear;
   the brake means is provided in the support for braking the input shaft; and
   the brake means comprising a pair of elastically deformable rods which elastically grasps the input shaft.

2. A reduction device as claimed in claim 1 wherein said drive means comprises an electric tool via an attachment.

3. A reduction device as claimed in claim 1 wherein said drive means comprises an electric motor jointed thereto.

4. A reduction device as claimed in claim 1 wherein said drive means comprises a manually-operated handle which is detachably mounted.

5. A reduction device as claimed in claim 1 wherein the input shaft is projected from one end of the support, said output means comprising an output shaft which is projected from the other end of the support to align the input shaft.

6. A reduction device as claimed in any of claim 1 wherein the output means comprises a winding drum for winding a wire which is wound by turning the input shaft.

7. A self-locking reduction device which comprises:
   a support; an input shaft which is rotatably mounted to the support and has an eccentric shaft portion; an external gear which is rotatably mounted to the eccentric shaft portion;

drive means for driving the input shaft;

output means which is rotatably mounted to the support and coaxial with the input shaft, said output means having an internal gear which is engaged wit the external gear, three pins or bores being formed at regular intervals on the external gear on a circumference around a center of said eccentric shaft portion, while three bores or pins being formed at regular intervals on the support facing the external gear on a circumference around a center of said input shaft, the former pins or bores being engaged with the latter bores or pins so that the external gear may be eccentrically moved, internal teeth of the internal gear engaged with the external teeth of the external gear being slightly more in number than the external teeth of the external gear;

the brake means is provided in the support for braking the input shaft; and the brake means comprising a pair of elastically deformable leaf springs which elastically grasps the input shaft.

8. A reduction device as claimed in claim 7 wherein said drive means comprises an electric tool via an attachment.

9. A reduction device as claimed in claim 7 wherein said drive means comprises an electric motor jointed thereto.

10. A reduction device as claimed in claim 7 wherein said drive means comprises a manually-operated handle which is detachably mounted.

11. A reduction device as claimed in claim 7 wherein the input shaft is projected from one end of the support, said output means comprising an output shaft which is projected from the other end of the support to align the input shaft.

12. A reduction device as claimed in any of claim 7 wherein the output means comprises a winding drum for winding a wire which is wound by turning the input shaft.

* * * * *